April 1, 1930.    W. EHRHART    1,752,979
RETURN APPARATUS
Filed June 8, 1928    2 Sheets-Sheet 1
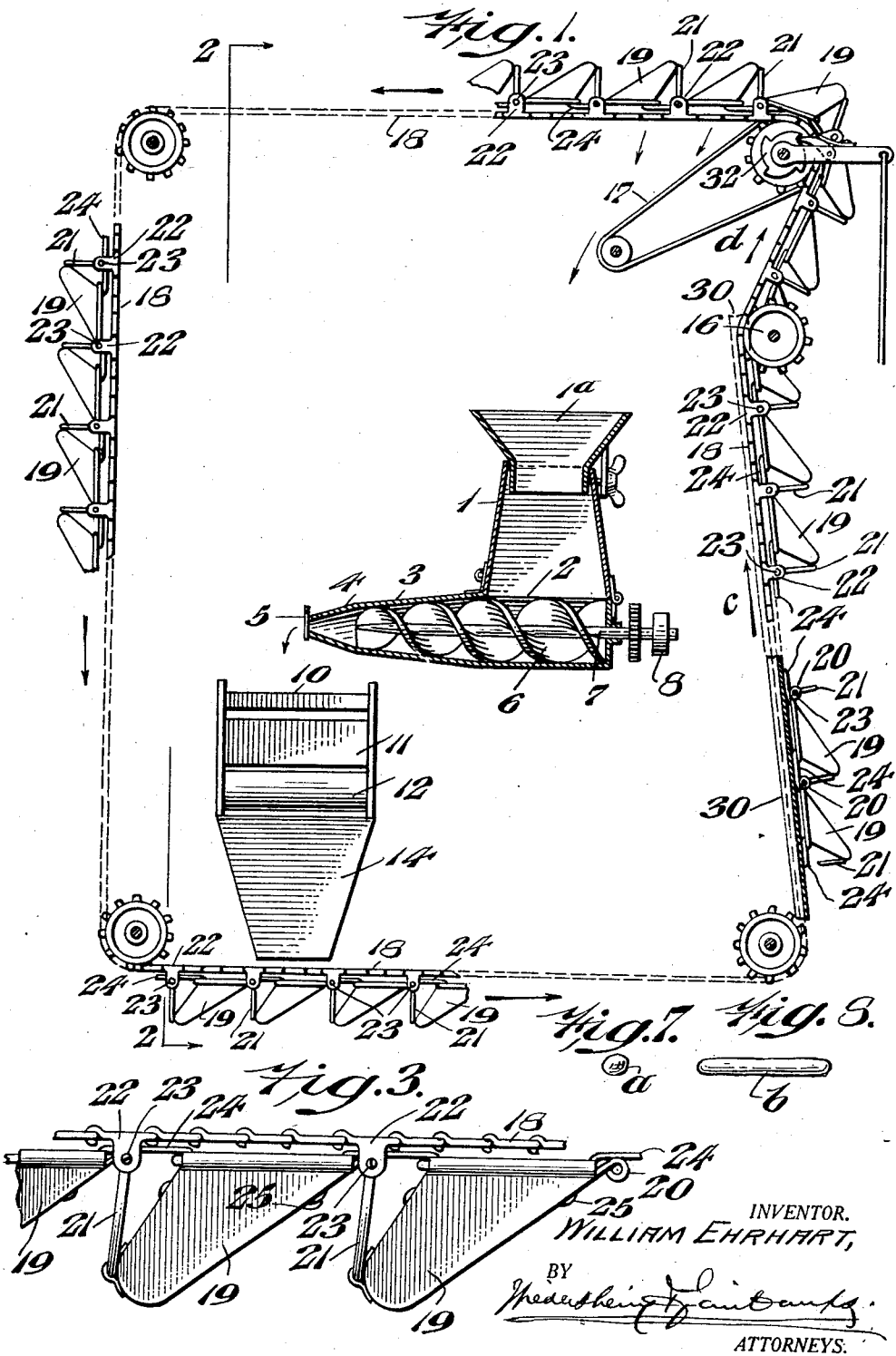
INVENTOR.
WILLIAM EHRHART,
BY
ATTORNEYS.

April 1, 1930. W. EHRHART 1,752,979
RETURN APPARATUS
Filed June 8, 1928 2 Sheets-Sheet 2
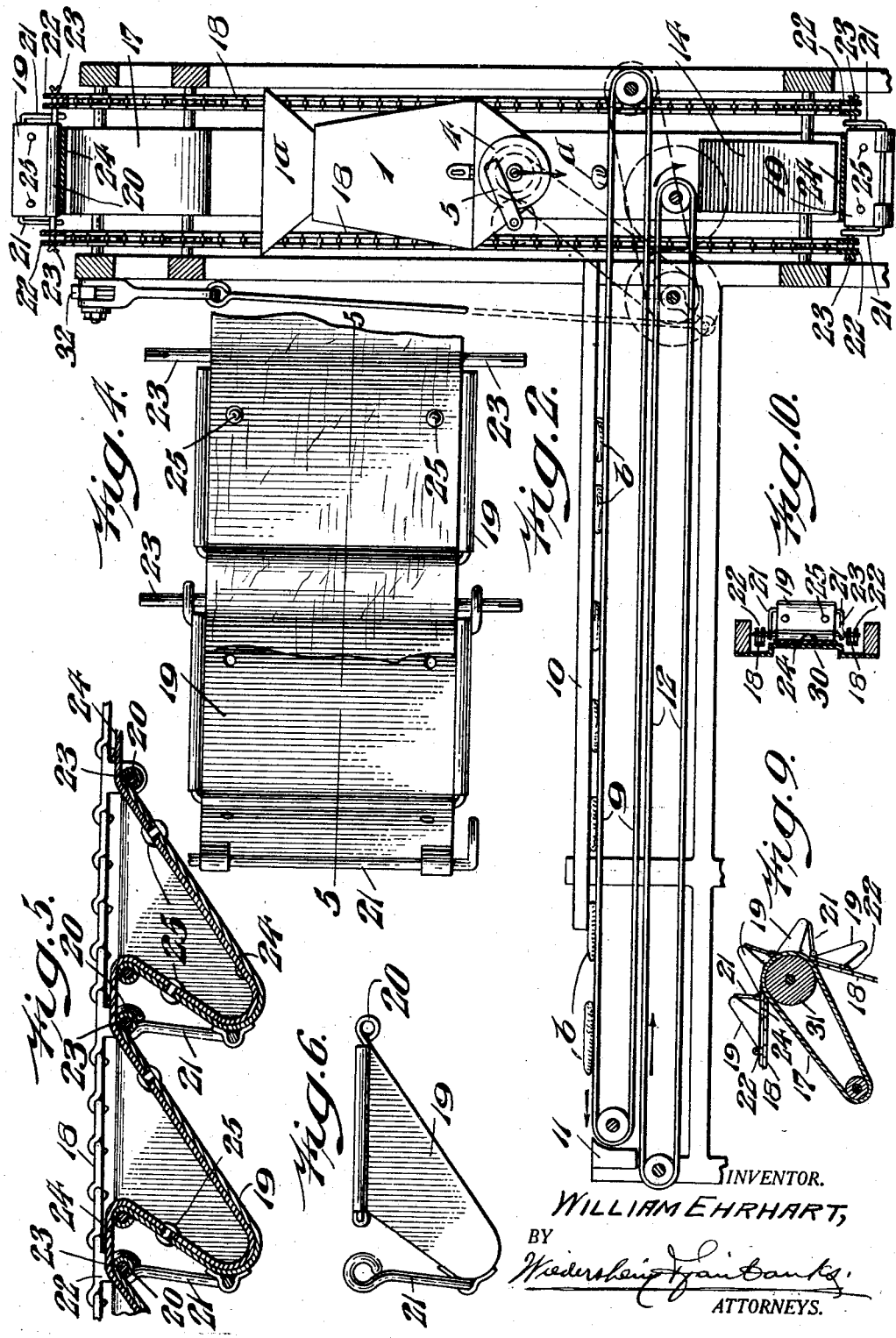

Patented Apr. 1, 1930

1,752,979

UNITED STATES PATENT OFFICE

WILLIAM EHRHART, OF LANCASTER, PENNSYLVANIA

RETURN APPARATUS

Application filed June 8, 1928. Serial No. 283,821.

This invention, generally stated, relates to return apparatus for various commodities but has more especial relation to a machine for returning strips of dough such as are used in the pretzel making art, whereby certain of the strips of dough may be returned to the feed hopper.

While the apparatus about to be described is particularly adapted for pretzel making machinery and will so be described, nevertheless it is to be understood that the apparatus of the invention is applicable to other arts where it is desired to return surplus or unused pieces, lumps, or particles of material.

Referring now specifically to the art of pretzel manufacture, it is customary to feed the dough for pretzel making from a central hopper to an endless belt. At a convenient point in the travel of the endless belt the baker removes the strips of dough as fast as may be for the forming of pretzels. However, in practice it seems that very often scraps or whole strips of dough are not removed from the conveyor by the baker and it is these particles or strips that it is desired to return to the hopper for remixing and returning to the endless conveyor.

The leading object, therefore, may be said to reside in the provision of means for returning from a horizontal conveyor to a series of vertically moving buckets scraps or strips of dough for remixing with the dough being presented to the main hopper.

A further object of the present invention is to provide apparatus of the character stated in which the endless chain of buckets is lined with a strip of canvas, adjacent buckets being connected with such canvas thereby to prevent the escape of dough being returned to the hopper.

A still further object of the present invention is to provide apparatus of the character stated in which means is present operatively connected between the various buckets making up the endless chain, whereby the buckets are always maintained in a position to have their open ends facing the dough hopper.

A further object of the present invention resides in the provision of general details of construction and arrangement and construction of parts for attaining the results sought by the foregoing objects.

With these and other objects in view, the invention consists of the novel construction hereinafter described and finally claimed.

The nature, characteristic features and scope of the invention will be more fully understood from the following description taken in connection with the accompanying drawings forming part hereof, and in which:

Fig. 1, is a diagrammatic view embodying features of the present invention.

Fig. 2, is a view in section taken upon the line 2—2 of Fig. 1.

Fig. 3, is a fragmentary view in side elevation of a detail of construction hereinafter described.

Fig. 4, is a view in plan of Fig. 3.

Fig. 5, is a view in horizontal section taken upon the line 5—5 of Fig. 4.

Fig. 6, is a fragmentary view in elevation hereinafter referred to.

Fig. 7, is a view illustrating a piece of dough as it leaves the dough feeder for delivery to the uppermost conveyor.

Fig. 8, is a view showing dough squeezed out into strip form as it passes along the upper conveyor.

Figs. 9 and 10 are views in detail, principally in section, hereinafter referred to.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, the reference numeral 1 designates a hopper provided with a flaring top 1$^a$ into which desired material, as for instance dough, is fed, although it is to be understood that other material, as for instance salt, may be fed. The lower end of the hopper 1 opens into a cylindrical horizontally arranged chamber 2, which chamber terminates in a conical shaped member 3. This conical member 3 in turn terminates in a tapered nozzle 4 provided with a rotary cutter 5. Within the horizontally arranged chamber 2 there is provided a helix or feed screw 6, see Fig. 1. The helix or feed screw 6 is mounted upon a shaft 7 provided with means to drive the same, as a pulley 8. The cutter end of the helix or feed screw 6 is arranged to deliver dough in the form of balls $a$, as shown in Fig. 7. As the balls of dough travel in the direction of the arrows upon endless band 9 they come in contact with the underside of the rolling board 10. During the travel of the balls of dough $a$ beneath the rolling board 10 the dough is rolled out into elongated strips $b$ as shown in Fig. 8. As the elongated strips of dough emerge from beneath the rolling board 10 the baker in charge removes the strips of dough for pretzel forming. It may be during operation that the operator either misses a strip of dough $b$ or certain particles thereof are broken off, and it is these missed and broken off particles that the apparatus of the present invention is designed to recover. Any missed strips $b$ or broken off particles thereof are deflected by the device 11 to the endless conveyor 12. With the dough deflected by device 11 upon belt 12 the dough is caused to pass to the right in Fig. 2 and is deposited within hopper 14, see Figs. 1 and 2. Thereupon the dough is elevated by the buckets 19 in the direction of the arrow $c$ shown in Fig. 1 at a slight inclination until the buckets reach the roller 15, at which time the endless belt of buckets is deflected in a tangential direction, see arrow $d$ around sprocket wheel 16. As the buckets 19 move upwardly in the direction of arrow $c$ the open ends thereof, which face the feed hopper, are closed to prevent escape of dough by means of a guard 30, see Fig. 1. This guard 30 extends throughout the extent of the run of the endless conveyor indicated by arrow $c$. From the upper termination of the guard 30 to the place of discharge of dough to hopper 1, the endless chain of buckets is so inclined that dough cannot fall or be discharged therefrom. At the place of dough discharge to the conveyor 17 the buckets pass over a drum 31, best seen in Figs. 9 and 10. As the buckets approach the drum 31 each bucket has its open face closed by the drum to prevent dough expulsion until a bucket is in alignment for delivery of dough to conveyor 17. As a bucket leaves the face of drum 31, see Fig. 9, the contents of a bucket is deposited upon conveyor 17 for return to feed hopper 1. The drum 31 and buckets 19 are operated in an intermittent manner by means of pawl and ratchet 32, so that each bucket has its open face closed and opened at proper intervals for dough delivery to conveyor 17. With the return of dough to hopper 1, it is deposited upon conveyor 9, as before described.

During the travel of the buckets after having received a deposit of material the said buckets travel in such a manner that the open ends thereof always face the feeding mechanism 2, the object being to keep the buckets in such position that the material is always maintained in position to prevent dumping of the contents from the buckets except at predetermined intervals.

Taking up now the buckets in detail, the same are carried by a pair of chains designated 18 and the buckets are designated 19. Fixed to each bucket is a rod 20, the ends of which project laterally from a bucket. The buckets are substantially scoop-shaped, having a broad, open face. The rod 20 is fixed to the open end of each bucket 19. Having pivotal relation with the closed end of each bucket is a pair of rods 21. These rods 21 are adapted to be maintained in a position substantially at right angles with respect to the chains 18, as is clearly shown in Fig. 3. Connecting each chain and each rod 21 is a member 22 which member has pivotal relation with respect to each rod as at 23. Thus, in the travel of the buckets 19 toward the return conveyor 17, the broad open faces of the buckets 19 are always maintained in a position facing the hopper 1. The purpose of the wheels 16 are to deflect the chains 18 in a direction toward the conveyor 17 and at an inclination with respect thereto so that the contents of the buckets 19 is positively prevented from being unduly emptied. As the buckets 19 approach the return conveyor 17 the broad open faces of the buckets now are positioned downwardly and in a direction pointing toward the conveyor 17 so that the contents of each bucket is directed toward and upon conveyor 17 and thereafter is caused to pass to hopper 1 for re-mix with such material being fed to the hopper. During the travel of the buckets it is to be noted that the members 23 positively space the buckets one from another and in their travel around the apparatus serve to maintain the open ends of the buckets properly positioned to face the hopper 1. Fitted within each bucket, preferably in a continuous manner, is a flexible piece of material 24, as convas, which is securely fixed to the inner faces of the buckets as by rivets 25. This endless strip of canvas serves to straddle the adjacent edges of the buckets 19 and serves to prevent dough within the buckets 19 escaping between the spaced buckets and also prevents dough from sticking to the walls of the buckets.

Conventional driving means, for operating the buckets, conveyor, and other parts, is employed but forms no part of the present invention.

I am aware that the invention may be embodied in other specific forms without departing from the spirit or essential attributes thereof and I therefore desire the present embodiment to be considered in all respects as illustrative and not restrictive, reference being had to the appended claims rather than to the foregoing description to indicate the scope of the invention.

Having thus described my invention, what I claim as new, and desire to secure by Letters Patent, is:

1. Apparatus of the character stated comprising feeding mechanism, an endless conveyor travelling in one direction to receive material fed, a second conveyor travelling in an opposite direction to receive un-used material from the first mentioned conveyor, an endless chain carrying a plurality of buckets for conveying un-used material from the last mentioned conveyor back to said feeding mechanism, and means operatively connected between said chain and buckets for always maintaining the open ends thereof in a direction facing said feeding mechanism.

2. Apparatus of the character stated comprising a dough feeder including a dough cutter, an endless conveyor travelling in one direction to receive cut dough, a second conveyor travelling in an opposite direction to receive dough from the first mentioned conveyor, an endless chain carrying a plurality of buckets for conveying un-used dough from the last mentioned conveyor back to said dough feeder, means operatively connected between said chain and buckets for always maintaining the open ends thereof in a direction facing said dough feeder, and means for causing said buckets to incline in a direction away from said dough feeder at a point adjacent delivery of dough from said buckets to said dough feeder.

3. Apparatus of the character stated comprising a dough feeder, a dough cutter carried by said dough feeder parts, an endless conveyor travelling in one direction to receive cut dough, a second conveyor travelling in an opposite direction to receive dough from the first mentioned conveyor, means for deflecting un-used dough from one conveyor to the other, an endless chain carrying a plurality of buckets for conveying un-used dough from the last mentioned conveyor back to said dough feeder, means for maintaining said buckets in properly spaced tilted position throughout their line of travel, means operatively connected between said chain and buckets for always maintaining the open ends thereof in a direction facing said dough feeder.

4. Apparatus of the character stated comprising a dough hopper, feeding mechanism, an endless conveyor travelling in one direction to receive material fed, a second conveyor travelling in an opposite direction to receive un-used material from the first mentioned conveyor, an endless chain carrying a plurality of buckets for conveying un-used material from the last mentioned conveyor back to said feeding mechanism, means including an auxiliary belt for passing scrap dough back to the hopper, and means operatively connected between said chain and buckets for always maintaining the open ends thereof in a direction facing said feeding mechanism.

5. Apparatus of the character stated comprising feeding mechanism, an endless conveyor travelling in one direction to receive material fed, a second conveyor travelling in an opposite direction to receive un-used material from the first mentioned conveyor, an endless chain carrying a plurality of buckets for conveying un-used material from the last mentioned conveyor back to said feeding mechanism, means operatively connected between said chain and buckets for always maintaining the open ends thereof in a direction facing said feeding mechanism, and means including a drum for closing the open ends of said buckets to reduce to a minimum dough droppings.

WILLIAM EHRHART.